United States Patent [19]

Thomas, Jr.

[11] 3,859,651

[45] Jan. 7, 1975

[54] BOOM ANGLE INDICATOR

[76] Inventor: Thomas W. Thomas, Jr., 121 Hawthorne Way, San Rafael, Calif. 94903

[22] Filed: Jan. 14, 1974

[21] Appl. No.: 432,974

[52] U.S. Cl. ...... 340/267 C, 116/124 F, 200/61.52, 335/206, 340/282, 340/383
[51] Int. Cl. .......................................... G08b 21/00
[58] Field of Search........ 340/267 C, 266, 282, 383; 116/124 F; 200/61.52; 335/206

[56] References Cited
UNITED STATES PATENTS

| | | | |
|---|---|---|---|
| 2,418,576 | 4/1947 | Conrad | 340/267 C |
| 2,922,994 | 1/1960 | Kennedy | 340/282 X |
| 3,419,731 | 12/1968 | Wheable et al. | 335/206 X |
| 3,548,400 | 12/1970 | Boyd et al. | 200/61.52 X |

Primary Examiner—David L. Trafton
Attorney, Agent, or Firm—Warren, Rubin & Chickering

[57] ABSTRACT

There is disclosed a boom angle indicator and alarm for use with a crane which includes a boom-mounted, gravity-actuated scale and pointer which reads directly the boom angle and which actuates magnetic switches to produce a visual boom indication in increments of a predetermined number of degrees on a scale at a remote location, which scale includes a visual alarm that is capable of being preset for limits of the boom angle for any particular load as well as permanently indicating the ultimate limits of the boom angle.

4 Claims, 4 Drawing Figures

BOOM ANGLE INDICATOR

BACKGROUND OF THE INVENTION

In operating a crane there is a danger of tipping over the crane if the boom angle is too great for the load being lifted. Boom angles that cannot be exceeded are established by manufacturer's specifications, and operators of cranes must be aware both of the load and of the manufacturer's specifications for each crane. Even when the maximum boom angle is known, there is some difficulty observing it. Although boom angle indicators are used, an operator must divide his attention between engaging and manipulating the load and observing the boom angle indicator which interferes with his efficiency and causes dangerous conditions if his concentration on moving the load is too intense.

This invention provides a combination of a boom-mounted boom angle indicator and a remotely mounted digital angle indicator which indicates the angle of the boom in preselected increments and is provided with a visual alarm that may be preset to indicate the limits of the boom angle for safe operation with any given load. The remotely mounted boom angle indicator also indicates the ultimate limits of the boom angle and is provided with a visual alarm to avoid exceeding those limits. The boom-mounted boom angle indicator is gravity actuated and comprises a pointer that is pivotally mounted to a scale with either the pointer or the scale being fixed to the boom and the other being weighted to be oriented with respect to vertical regardless of the boom angle.

The scale of the boom-mounted indicator has a plurality of magnetic switches associated with it so that a magnet mounted in the pointer will actuate each switch when it is in its immediate proximity, and the switches in turn are connected to actuate an array of lights on the remotely mounted indicator. The remotely mounted indicator typically is within the operator's cab although it may be mounted wherever monitoring of the boom angle is required.

The array of lights on the remotely mounted indicator is such that the ultimate limits for the crane boom angle are indicated by some alarm means, for example red lights. The other lights in the array are similar to each other and are typically white lights which are sequentially illuminated and extinguished as the boom angle changes.

In most cranes the ultimate limits for the boom angle usually are 10° from the horizontal and 88° from the horizontal. These are the limits that the boom angle should not exceed even when the crane is not loaded. The remotely mounted indicator is provided usually with a red light to indicate 88° from the horizontal and another red light to indicate 10° from the horizontal so that an operator can quickly observe, even without his close attention, that these angles are being exceeded when he sees a red light flash within his cab.

The remotely mounted indicator is also provided with a movable member to indicate the boom angle that cannot be exceeded when the crane is lifting a particular load. This boom angle will usually be determined from the manufacturer's specifications for that particular crane. It may be in terms of the maximum boom angle for a particular size shovel or for a particular weight of container or other package of items. When this boom angle is determined from the manufacturer's specification, a movable member on the remote indicator that indicates an alarm on the remote indicator is moved to superimpose the illuminated angle indicator light that represents the maximum boom angle for that load. For example, the indicator may superimpose a white light with a red transparent element so that that angle, whether it is 30°, 60° or any other illuminated increment, will show red when it is reached and will in turn catch the operator's eye as a red alarm signal that flashes on so that he is made aware that the limit of the crane for that particular load has been reached even without paying close attention to the boom angle indicator.

DETAILED DESCRIPTION OF THE INVENTION

The invention may be better described with reference to the accompanying drawings which illustrate particular embodiments embodying the invention.

Figure 1:
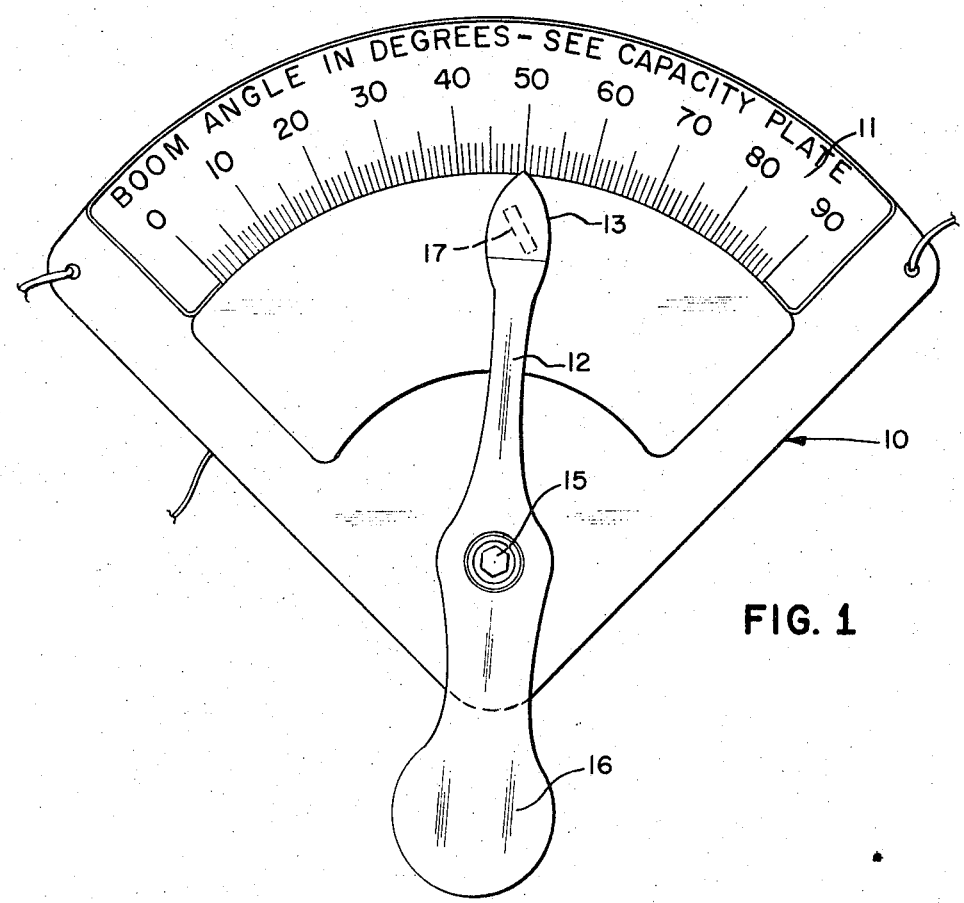
FIG. 1 is a typical boom-mounted boom angle indicator.
Figure 2:
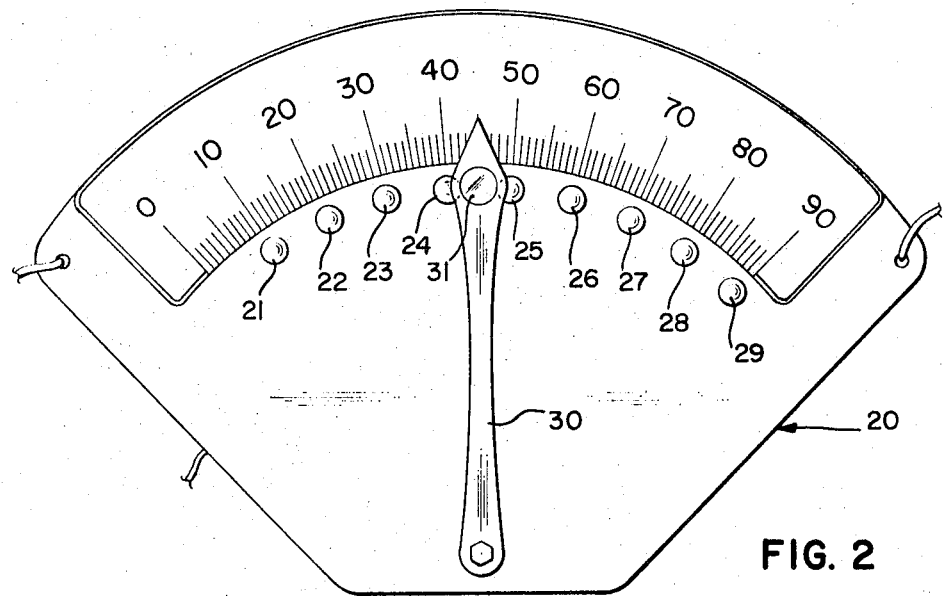
FIG. 2 is a typical remotely mounted booom angle indicator.

FIG. 1 illustrates a boom-mounted indicator generally designated 10 which includes a scale 11 and a pointer 12. The pointer 12 has an angle indicating portion 13, a pivot 15 and a weighted end 16 which desirably is much heavier than the portion 13 extending above the pivot 15. This arrangement maintains the pointer 12 so that it is always vertical due to the force of gravity acting on the weighted portion 15. The scale 11 is divided in graduations which may be individual degrees, 5°, 10°, etc. that indicate the angle from horizontal of the boom on which the scale is mounted. In the illustration shown, the boom angle is about 50° from horizontal. Of course the indicator could be mounted to indicate the angle from vertical. The pointer 12 will have embedded within it a magnet 17 which is capable of actuating magnetic switches behind the panel of the indicator as will be explained in more detail hereinafter.

The remotely mounted boom angle indicator, generally designated 20, is also provided with a scale with appropriate graduations to indicate the angle from horizontal at which the boom angle is. However, instead of a gravity-actuated pointer the remote boom angle indicator 20 is provided with light bulbs 21–29 inclusive. Bulbs 21 and 29 normally will be red or other alarm-indicating color to indicate a boom angle that cannot be exceeded under any circumstances even when the crane is not lifting a load. Light bulbs 22–28 inclusive normally will be white light bulbs that do not indicate a critical boom angle. The remotely mounted boom angle indicator includes an adjustable element 30 that contains a transparent alarm portion 31 that may be moved to superimpose one of light bulbs 22–28. Typically, light bulbs 22–28 inclusive are white while light bulbs 21 and 29 are red, and the alarm element 31 is red so that any of light bulbs 22–28 which light when they are superimposed by element 31 will also flash red indicating an alarm.

Figure 3:
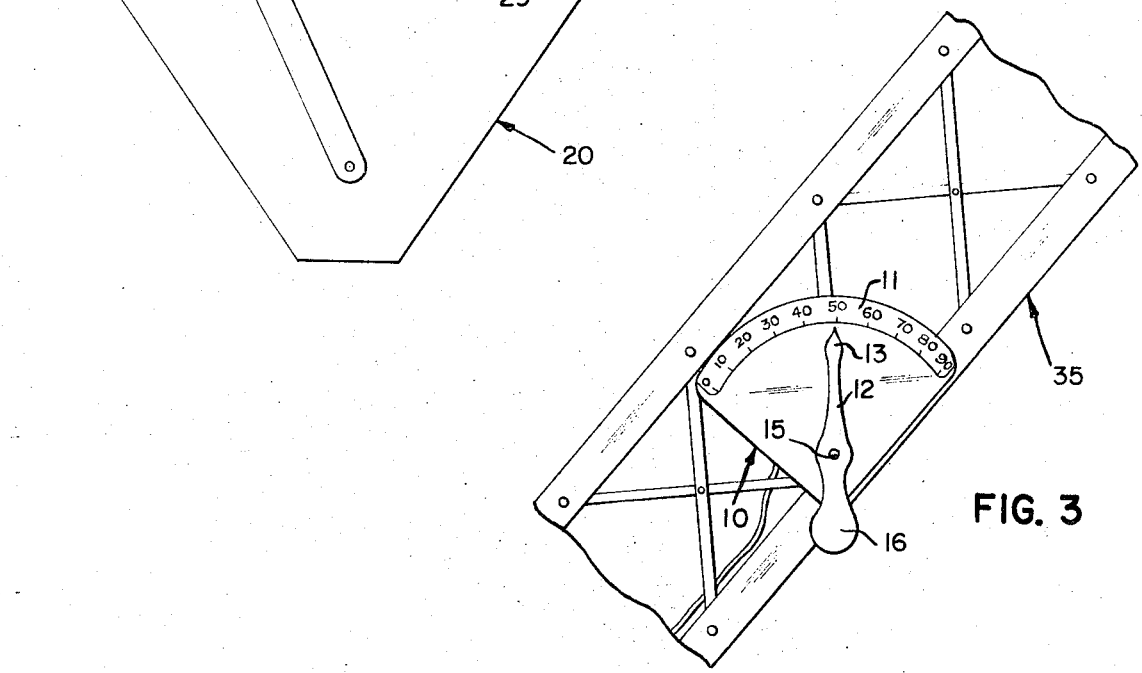
FIG. 3 is a partial elevation view of a boom-mounted, boom angle indicator embodying this invention illustrated as it would be mounted on a boom.

FIG. 3 illustrates the boom-mounted indicator illustrated in FIG. 1 as fixed to a boom generally designated 35. The boom 35 is illustrated at an angle of about 50° from horizontal and the boom-mounted boom angle indicator is shown with the pointer pointing at about 50° on the scale that is fixed to the boom. It is, of course, evident that the pointer could be fixed to the boom and a suitably weighted, gravity actuated scale could be vertically oriented so that the boom angle with respect to horizontal would be indicated.

Figure 4:
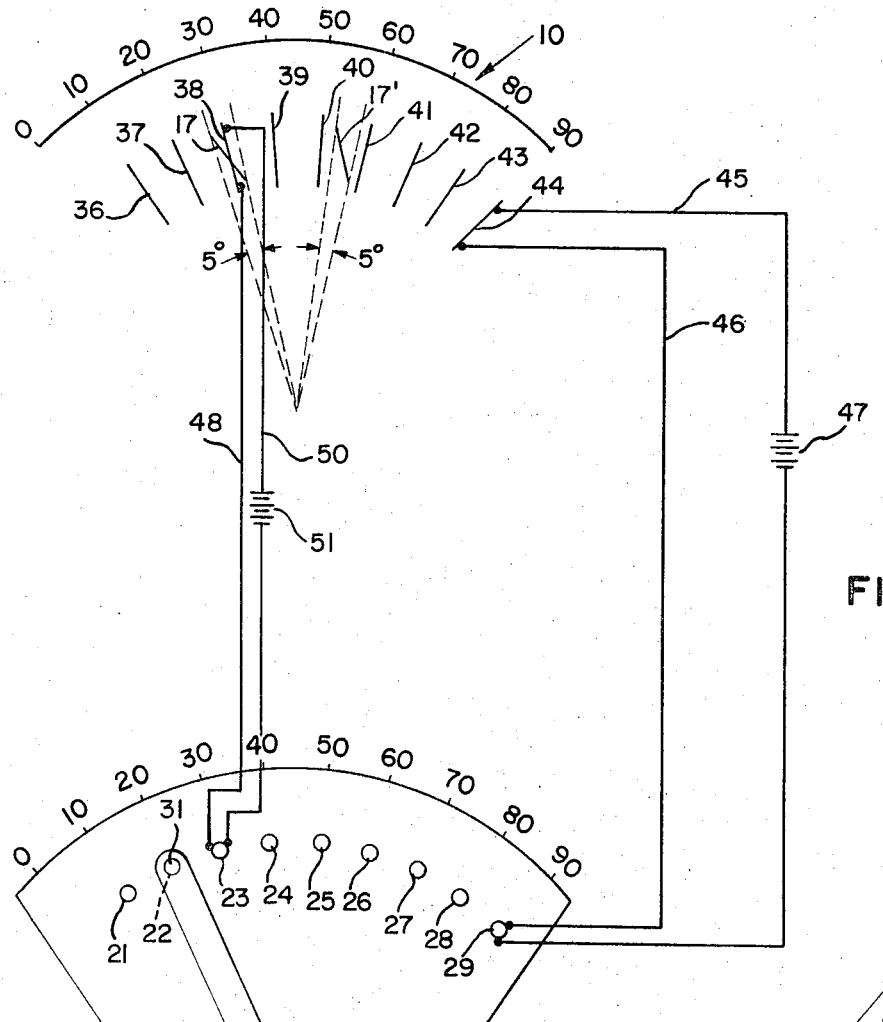
FIG. 4 is a schematic diagram illustrating a magnetic and an electric circuit interconnecting the boom-mounted indicator and the remote-mounted indicator and embodying this invention.

FIG. 4 illustrates schematically the electric and magnetic connections between the boom-mounted boom angle indicator and the remotely mounted boom angle indicator. The boom-mounted boom angle indicator 10 is shown at the top of FIG. 4 without the pointer 12 except the portion illustrated schematically as the magnet 17 and 17' which are normally embedded in the pointer 12. Behind each 10° increment on the scale there is positioned a group of magnetically actuated switches numbered 36–44 inclusive. These switches are typically reed switches which are closed only when in the immediate vicinity of a magnet.

Each of the magnetic reed switches 36 through 44 is associated with a particular portion of the scale indicating the degrees from 0° to 90° that the boom occupies with respect to horizontal. As here illustrated, a magnetic reed switch is associated with each of 10°, 20°, 30°, 40°, 50°, 60°, 70°, 80° and 88° from horizontal which respectively are switches 36 through 44. Each switch is connected to an electrical circuit such as those shown with respect to switch 38 and switch 44, switch 38 being typical of an intermediate switch while switch 44 is typical of an ultimate position switch. When magnetic reed switch 44 is closed, lines 45 and 46 which include a power source 47 will cause light bulb 29 to illuminate. As stated heretofore, light bulb 29 is an alarm-colored light bulb which will warn the operator that the ultimate position of the crane has been reached and that making a steeper angle with horizontal should be avoided. When the magnet 17 superimposes any portion of magnetic reed switch 38, that circuit is closed so that lines 48 and 50 which include a power source 51 will cause the light bulb 33 to illuminate. When the pointer is between magnetic switches as illustrated at 17', no magnetic switch will be closed and no light bulb will be illuminated.

An important feature of this invention is illustrated in FIG. 4. The magnet shown both in position 17 and 17' is not aligned with the magnetic reed switches 36–44 inclusive but rather is oriented at an angle with respect to magnetic reed switches. As a consequence, the magnetic reed switches will be actuated through a specific arc of travel of the pointer illustrated herein as 5°. Thus, as the pointer on the boom-mounted boom angle indicator moves from 20° toward 30°, for example, when the first portion of magnet 17 superimposes the reed switch 38, that switch will close, thereby illuminating light bulb 23. Magnetic reed switch 38 will remain closed until all portions of the magnet 17 cease to superimpose it, and accordingly light bulb 23 will remain illuminated until the trailing edge of magnet 17 no longer superimposes magnetic reed switch 38. As illustrated herein, the amount that magnet 17 is misaligned or cocked out of alignment with magnetic reed switch 78 occupies 5° of arc of the pointer passing from 20° to 30° so that the light bulb 23 would become illuminated when the boom angle is 27.5° from horizontal and would remain illuminated until the boom angle is 32.5° from horizontal. Moving from 30° toward 40° from horizontal, light bulb 23 would be extinguished when the boom angle was 32.5° from horizontal, but when the boom angle reached 37.5° from horizontal, light bulb 24 will illuminate to indicate the boom is at 40° and it would remain illuminated until the boom angle reached 42.5° from horizontal.

In the embodiment illustrated in FIG. 4 the remotely mounted boom angle indicator 20 is set to provide an alarm to the crane operator when the boom angle reaches 20° from horizontal. It may be seen from the illustration that as the boom moves from an angle of, for example, 50° toward an angle of 20°, each 5° increment will produce a unique result. For example, if the operator were to move the crane to lesser angles with the horizontal starting at about 50°, light bulb 25 would be illuminated until the boom reached an angle of 47.5° at which time all lights would be extinguished for 5°, after which light bulb 24 would be illuminated for 5°, after which all light bulbs would be extinguished for 5°, after which light bulb 23 would be illuminated for 5°, after which all light bulbs would be extinguished for 5°, after which light bulb 22 would be illuminated.

Since bulb 22 is superimposed with an alarm indicating element 31, it would become illuminated as an alarm light and indicate to the operator that the maximum boom angle had been reached and that no further lowering of the boom should be made to avoid a dangerous situation. It is, of course, evident that by cocking magnets 17 to greater misalignment with the switches that the period where no light bulbs are illuminated may be diminished or even avoided altogether so that one light bulb or another is on at all times. Regardless of how the sequence of illumination is accomplished, the operator is capable of observing within his own cab the rate at which the boom angle is approaching the maximum boom angle and the point at which the maximum boom angle is reached. It is also evident that in the illustration shown, a 2½° safety factor is built into the alarm. In the illustrated embodiment the boom angle of 20° is actually illuminated at 22.5° so that some response time for the operator is available in the alarm system.

It is also evident that each of magnetic reed switches 36–44 inclusive will be provided with wiring connecting it to its corresponding light bulb 21–29 and that each will be provided with its own or with a common power source so that the light bulbs can be illuminated. It is also evident that the scale shown on the remotely mounted indicator 20, although in the form of a quadrant of a circle, could be linear or arranged in any other manner to particularly suit it for the operator's control panel and that the arrangement shown here is not a limitation of this invention. It is also within the scope of this invention to provide audible alarms,

What is claimed is:

1. A boom angle indicator comprising in combination:
   A. A boom-mounted, gravity-actuated indicator including a pivoted pointer and a scale with one of said pointer and scale, weighted to remain in a vertically-oriented position established by gravity regardless of the boom angle, and the other of said pointer and scale fixed to the boom,
   B. A magnet associated with said pointer, C. A plurality of magnetic switches mounted on said scale, spaced a predetermined number of degrees apart and positioned to be actuated by the magnet on the pointer when the magnet superimposes a switch.

D. Said switches actuating lights on a remotely mounted scale to indicate the boom angle.

2. The boom angle indicator of claim 1 wherein said magnet and switches are mounted to be out of alignment whereby the magnet superimposes each switch through a predetermined arc through which said pointer travels.

3. The boom angle indicator of claim 1 wherein said remotely mounted scale includes alarm lights to indicate when the boom is at an ultimate angle that cannot be exceeded.

4. The boom angle indicator of claim 1 wherein said remotely mounted scale includes an adjustable alarm to indicate any preselected light on said scale as an alarm light to indicate an angle beyond which the boom should not be maintained.

* * * * *

UNITED STATES PATENT OFFICE
CERTIFICATE OF CORRECTION

PATENT NO. : 3,859,651
DATED : January 7, 1975
INVENTOR(S) : THOMAS W. THOMAS, JR.

It is certified that error appears in the above--identified patent and that said Letters Patent are hereby corrected as shown below:

Abstract, line 5, after "boom", insert --angle--.

Signed and sealed this 7th day of June 1975.

(SEAL)
Attest:

RUTH C. MASON
Attesting Officer

C. MARSHALL DANN
Commissioner of Patents
and Trademarks